United States Patent [19]

Coleman

[11] Patent Number: 5,297,676
[45] Date of Patent: Mar. 29, 1994

[54] ROD MOUNTED FISHING TACKLE BOX/CYLINDER

[76] Inventor: Bruce Coleman, Nostrand Ave., Apartment 1D, New York, N.Y. 11206

[21] Appl. No.: 89,230

[22] Filed: Jul. 9, 1993

[51] Int. Cl.$^5$ ............... A01K 97/04; A01K 97/06; A01K 97/10
[52] U.S. Cl. .................. 206/315.11; 43/25.2; 43/54.1; 224/922
[58] Field of Search ........ 43/25.2, 57.1, 57.2, 43/25, 54.1; 206/315.11; 224/103, 35, 922

[56] References Cited

U.S. PATENT DOCUMENTS

| D. 59,775 | 6/1921 | Roehl . |
| D. 308,090 | 6/1987 | Yeh . |
| D. 320,504 | 1/1989 | Mroczka . |
| D. 321,983 | 5/1989 | Tackett et al. . |
| D. 325,122 | 6/1990 | Meyers . |
| D. 325,672 | 9/1989 | Baker . |
| 3,026,644 | 3/1962 | Raider ................. 43/25.2 |
| 4,353,182 | 10/1982 | Junkas et al. ............. 206/315.11 X |
| 4,628,628 | 12/1986 | Burgin et al. ............. 224/922 X |
| 4,920,683 | 5/1990 | Weber ................. 43/25.2 |
| 5,131,179 | 7/1992 | McEwen ............. 206/315.11 X |
| 5,220,742 | 6/1993 | Lewis ............. 206/315.11 X |

*Primary Examiner*—Paul T. Sewell
*Assistant Examiner*—Jacob K. Ackun, Jr.
*Attorney, Agent, or Firm*—Brumbaugh, Graves, Donohue & Raymond

[57] ABSTRACT

A tackle box is mounted onto a fishing rod handle. The tackle box has a hollow cylindrical housing with one open threaded end which holds a compartmentalized drawer. The drawer has attached to it a threaded screw cap which rotates independently of the drawer so that when the drawer is slid into the housing, the threaded open end of the housing receives the threaded screw cap. The tackle box is mounted to a fishing rod using a pair of rod supports which protrude from the top of the cylindrical housing. The rod handle may be secured to the supports by any one of a number of fastening means.

9 Claims, 2 Drawing Sheets

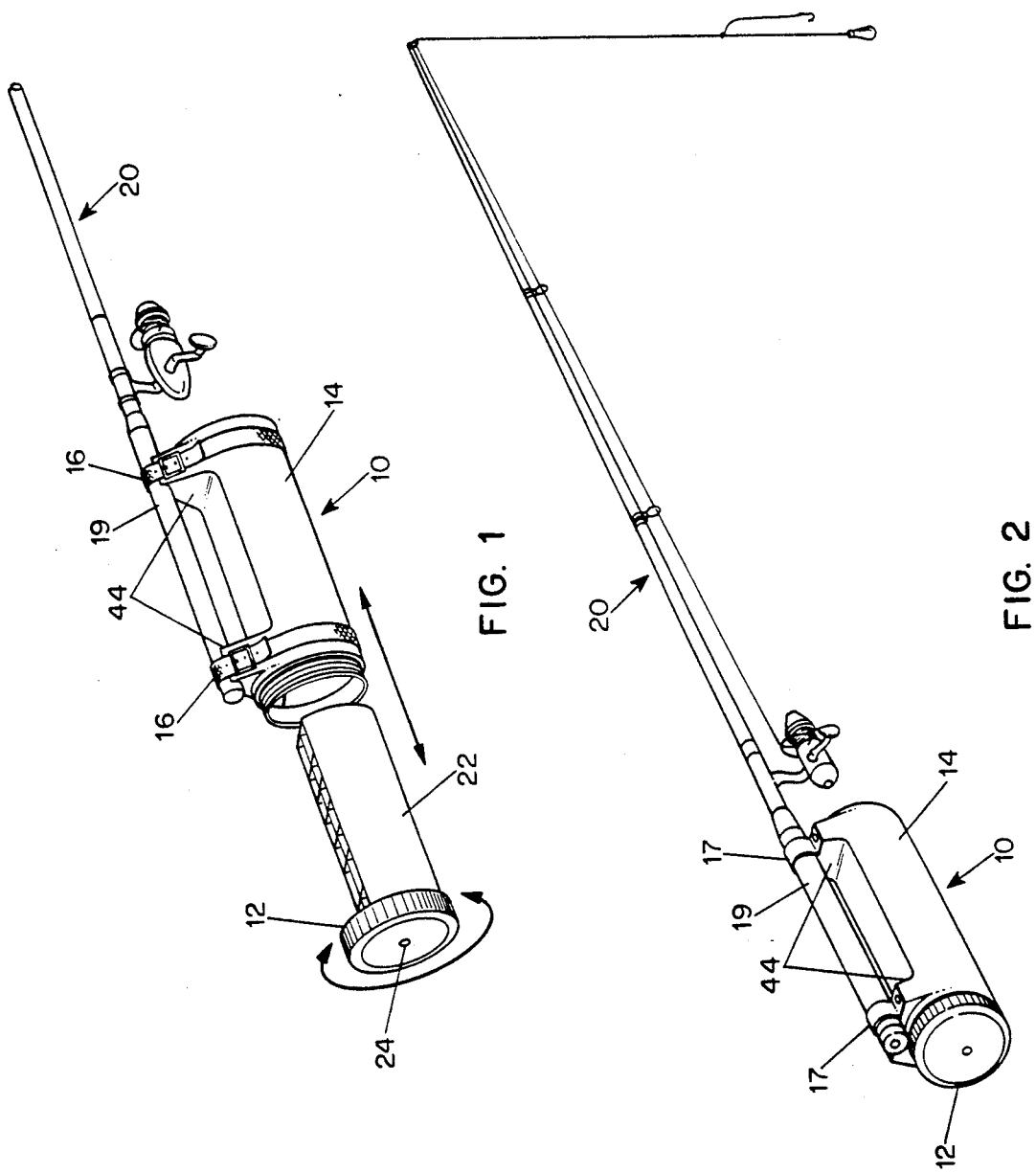

ROD MOUNTED FISHING TACKLE BOX/CYLINDER

BACKGROUND OF THE INVENTION

The present invention relates to fishing equipment, and, in particular, to a tackle box which attaches to a fishing rod.

When going on a fishing outing, there is a lot of equipment which the well-prepared fisherman should take. He or she should have, of course, a fishing rod, spare fishing line, knives, and numerous hooks, sinkers, bobbers, lures, etc. Often, a tackle box is used to organize and transport the paraphernalia. A typical tackle box has a tray or two which is subdivided into several compartments into which the fishing paraphernalia is placed. These boxes have a hinged top to which a handle is attached. Carrying the box leaves the fisherman with only one free hand which typically will be used to carry the fishing rod. Since each participant in a fishing outing will ordinarily have his or her own fishing rod and tackle box, other necessary fishing trip items such as snacks and/or liquid refreshments must then be carried awkwardly by the same hand which is carrying the tackle box or the rod, or two trips between the car and the desired fishing location must be made. Thus, there is a need for a tackle box which does not need to be carried by a separate hand.

SUMMARY OF THE INVENTION

The above described problem with the typical tackle box has been overcome by the present invention in which a cylindrical tackle box is mounted onto a fishing rod handle. According to the invention, a hollow cylindrical housing with one open threaded end holds a compartmentalized drawer. The drawer has attached to it a threaded screw cap which rotates independently of the drawer so that when the drawer is slid into the housing, the threaded open end of the housing receives the threaded screw cap. A flat rider is mounted along the length of the inside of the cylindrical housing at a height which leaves enough space between the rider and the bottom of the housing to allow the drawer to slide in and out. The rider prevents fishing paraphernalia contained in the drawer compartments from falling out of the drawer within the cylindrical housing. The tackle box is mounted to the rod using a pair of rod supports which protrude from the top of the cylindrical housing. Each support may have a concave top portion for receiving the fishing rod handle. The rod handle may be secured to the supports by any one of a number of fastening means including straps and clamps.

BRIEF DESCRIPTION OF THE DRAWINGS

Other objects, features and advantages of the invention will become apparent, and its construction and operation better understood, from the following detailed description when read in conjunction with the accompanying drawings, in which:

FIG. 1 is a perspective view of one embodiment of the present invention attached to a fishing rod in the open position.

FIG. 2 is a perspective view of a second embodiment of the present invention attached to a fishing rod in the closed position.

DETAILED DESCRIPTION OF THE PREFERRED EMBODIMENT

Figure 3:
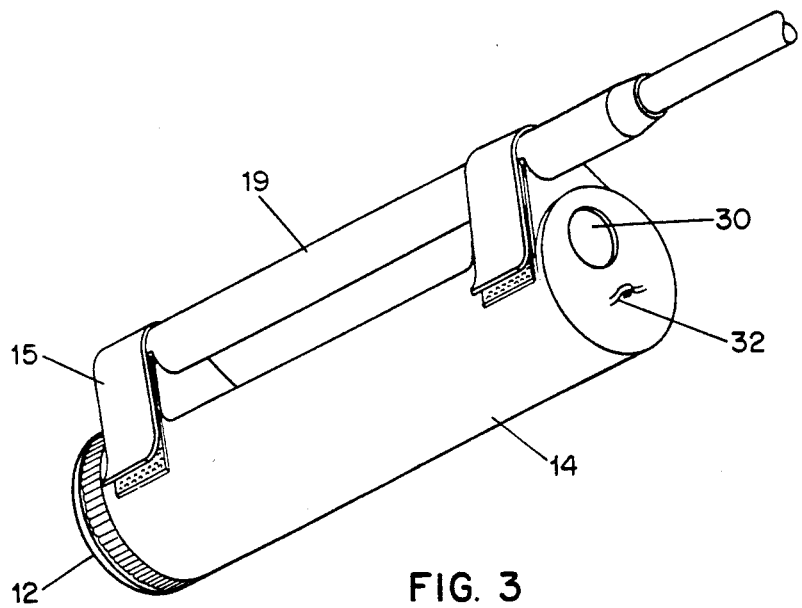
FIG. 3 is a perspective view of a third embodiment of the present invention attached to a fishing rod in the closed position.

In FIG. 1, a first embodiment of the tackle box 10 is depicted mounted on the handle 19 of a fishing rod 20. The tackle box 10 has a hollow cylindrical housing 14 which encases a compartmentalized drawer 22 for holding fishing paraphernalia. The drawer 22 slides in and out of the housing 14 as indicated by the horizontal arrows. In the figure, the drawer is shown removed from the housing 14. The end of the drawer 22 which slides in last has a threaded screwcap 12 attached. The screwcap 12 rotates independently of the drawer 22, as indicated by the curved arrows, and is attached using a loose rivet 24. The end of the housing 14 which receives the drawer 22 is threaded so as to allow the threaded screwcap 12 to mate with the housing 14 when the drawer 22 is slid all the way into the housing 14 and rotated clockwise.

In this embodiment, the tackle box 14 is mounted to the rod handle using straps 16. The straps 16 may be leather, nylon or any other suitable material. The straps 16 are wrapped around the cylindrical circumference of the housing 14 along two mounting areas 44, which project from the top of the housing 14, over the rod handle 19 and are secured by buckles. The top of each of the mounting areas 44 has a concave surface in which the rod handle 19 is placed. The concave surface may be lined with rubber to prevent the rod handle 19 from slipping. The mounting areas 44 project far enough from the top of the housing 14 to allow a fisherman's hand to fit in the space defined by the rod handle 19, the top of the housing 14 and the mounting areas 44.

In the second embodiment of the present invention, as shown in FIG. 2, the drawer 22 is closed and the screwcap 12 has been turned clockwise to secure the drawer 22 within the housing 14. In this embodiment, the tackle box is mounted to the rod handle using clamps 17 on the mounting areas 44 of the housing 14 rather than straps as in the embodiment of FIG. 1.

FIG. 3 illustrates an embodiment having two additional features, as well as a third means for mounting the tackle box 10 to a fishing rod handle 19. The first feature is a hook holder 32 which may be integrally formed with or attached to the end of the housing 14 opposite the screwcap. The hook holder 32 projects from the housing and has a hole into which the hook on the end of the fishing line may be fastened when the rod is not in use. Above the hook holder 32 is a sinker port 30 into which a sinker, which will typically also be at or near the end of the fishing line, may be placed when the hook is fastened to the hook holder 32. This will prevent the sinker from freely swinging thereby avoiding possible injury to a passerby. Hook and loop cloth straps 15, e.g. "Velcro ®" straps, secure the tackle box 10 to the fishing rod handle 19.

Figure 4:
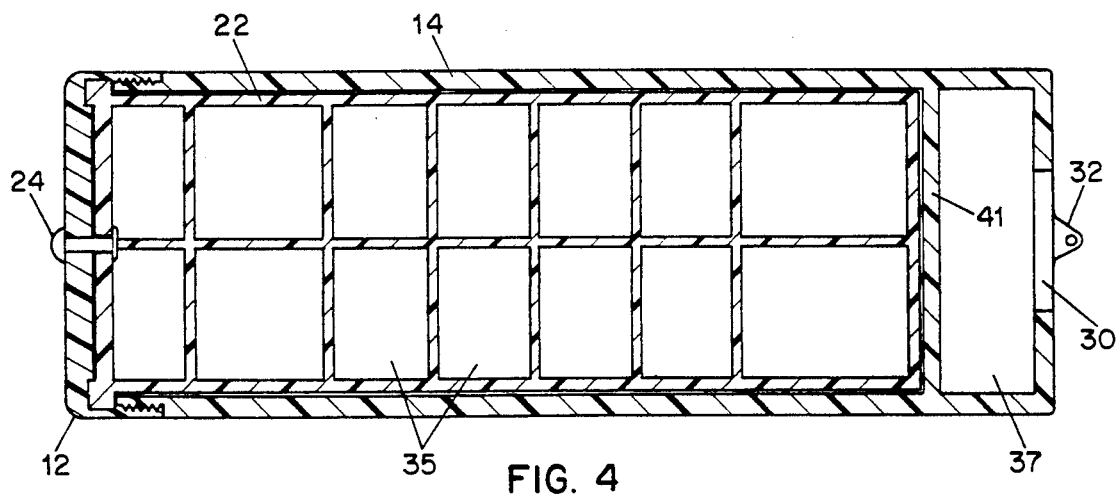
FIG. 4 is a cross-sectional top view of a housing and drawer useful in the present invention.

Referring to FIG. 4, the drawer 22 is divided into numerous compartments 35 for storing hooks, sinkers, bobbers and whatever other equipment a fisherman may want to keep in the tackle box. The drawer 22 does not extend the entire length of the housing 14. Rather, the rear of the drawer abuts a divider 41. The divider 41 and the remaining length of housing 14 define the sinker compartment 37 where the sinker is held once placed into the sinker port 30.

Figure 5:
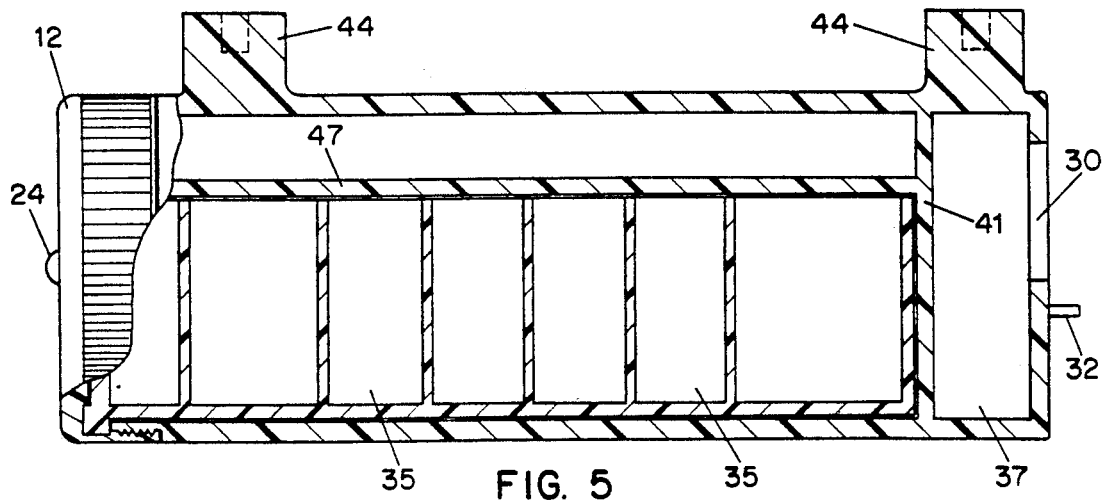
FIG. 5 is a side cross-sectional side view of the housing and drawer shown in FIG. 4.

FIG. 5 shows the rider 47, which is a flat piece that extends along the interior of the housing 14 from the open end of the housing to the divider 41. It is secured at a height just above the height of the drawer 22 so as to define a contained area into which the drawer is slid. The rider 47 keeps the drawer from moving within the housing 14 and keeps the contents of the drawer within their respective compartments 35, even if the tackle box 10 is turned upside down.

While the above is a description of the invention in its preferred embodiment, various modifications, alternate constructions and equivalents may be employed, only some of which have been described above. For example, any number of suitable materials including fiberglass, plastic or graphite may be employed in constructing the tackle box. Therefore, the above description and illustration should not be taken as limiting the scope of the invention which is defined by the appended claims.

I claim:

1. A fishing tackle box which mounts onto the handle of a fishing rod comprising:
    a hollow cylindrical housing having a top, a bottom, a closed end and an open threaded end;
    a compartmentalized drawer for holding fishing paraphernalia having a first end and a second end, the drawer being slidably engaged with the cylindrical housing so that the first end slides in first and the second end remains exposed at the open end of the cylindrical housing;
    a threaded screw cap rotatably mounted on the second end of the drawer so that when the drawer is slid into the housing, the threaded end of the housing receives the threaded screw cap;
    a flat rider mounted along the top of the interior of the cylindrical housing leaving enough space between the rider and the bottom of the housing to allow the drawer to slide in and out such that when the drawer is slid in, the rider prevents any fishing paraphernalia which may be contained in the drawer from falling out of the drawer within the cylindrical housing;
    a pair of mounting areas projecting from the top of the cylindrical housing; and
    means for securing the fishing rod handle to the mounting areas.

2. The fishing tackle box of claim 1 wherein the means for securing the fishing rod handle to the mounting areas comprises a strap wrapped around the cross sectional circumference of the housing at each mounting area and a means for fastening the straps.

3. The fishing tackle box of claim 1 wherein the top of each mounting area is concave.

4. A fishing tackle box which mounts onto the handle of a fishing rod comprising:
    a hollow cylindrical housing having a top, a bottom, an open threaded end and a substantially closed end having a sinker port opening;
    a hook holder protruding from the substantially closed end of the cylindrical housing;
    a compartmentalized drawer for holding fishing paraphernalia having a first end and a second end, the drawer being slidably engaged with the cylindrical housing so that the first end slides in first and the second end remains exposed at the open end of the cylindrical housing;
    a threaded screw cap rotatably mounted on the second end of the drawer so that when the drawer is slid into the housing, the threaded end of the housing receives the threaded screw cap;
    a flat rider mounted along the top of the interior of the cylindrical housing leaving enough space between the rider and the bottom of the housing to allow the drawer to slide in and out such that when the drawer is slid in the rider prevents any fishing paraphernalia which may be contained in the drawer from falling out of the drawer within the cylindrical housing;
    a pair of mounting areas projecting from the top of the cylindrical housing; and
    means for securing the fishing rod handle to the mounting areas.

5. The fishing tackle box of claim 4 wherein the drawer does not extend to the substantially closed end of the housing when slid in, the fishing tackle box further comprising a divider between the first end of the drawer and the substantially closed end of the housing whereby a sinker compartment is formed within the housing at the substantially closed end of the housing.

6. The fishing tackle box of claim 4 wherein the means for securing the fishing rod handle to the mounting areas comprises a strap wrapped around the cross sectional circumference of the housing at each mounting area and a means for fastening the straps.

7. The fishing tackle box of claim 4 wherein the top of each mounting area is concave.

8. The fishing tackle box of claim 5 wherein the means for securing the fishing rod handle to the mounting areas comprises a strap wrapped around the cross sectional circumference of the housing at each mounting area and a means for fastening the straps.

9. The fishing tackle box of claim 5 wherein the top of each mounting area is concave.

* * * * *